United States Patent
Rozich

(10) Patent No.: US 7,309,435 B2
(45) Date of Patent: Dec. 18, 2007

(54) BIOLOGICAL PROCESS FOR WASTE TREATMENT AND ENERGY PRODUCTION

(76) Inventor: Alan F. Rozich, 508 Brandywine Pkwy., West Chester, PA (US) 19380

( * ) Notice: Subject to any disclaimer, the term of this patent is extended or adjusted under 35 U.S.C. 154(b) by 356 days.

(21) Appl. No.: 10/791,644

(22) Filed: Mar. 2, 2004

(65) Prior Publication Data
US 2005/0194311 A1 Sep. 8, 2005

(51) Int. Cl.
*C02F 3/00* (2006.01)
(52) U.S. Cl. .............. 210/621; 210/622; 210/623; 210/624; 210/626; 210/631
(58) Field of Classification Search ........ 210/631, 210/621, 622, 623, 624, 626
See application file for complete search history.

(56) References Cited

U.S. PATENT DOCUMENTS

| | | | |
|---|---|---|---|
| 695,573 A | 3/1902 | Magnier et al. | |
| 4,067,801 A | 1/1978 | Ishida et al. | |
| 4,321,141 A | 3/1982 | Messing | |
| 4,341,609 A | 7/1982 | Eskamani et al. | |
| 4,626,354 A * | 12/1986 | Hoffman et al. | 210/603 |
| 4,696,746 A | 9/1987 | Ghosh et al. | |
| 4,915,840 A | 4/1990 | Rozich | |
| 4,960,427 A | 10/1990 | Noiles | |
| 5,141,646 A | 8/1992 | Rozich | |
| 5,228,995 A | 7/1993 | Stower | |
| 5,364,509 A | 11/1994 | Dietrich | |
| 5,492,624 A | 2/1996 | Rozich | |
| 5,500,123 A | 3/1996 | Srivastava | |
| 5,525,229 A | 6/1996 | Shih | |
| 5,529,692 A | 6/1996 | Kubler | |
| 5,591,342 A | 1/1997 | Delporte et al. | |
| 5,630,942 A | 5/1997 | Steiner | |
| 6,090,266 A | 7/2000 | Roychowdhury | |

* cited by examiner

*Primary Examiner*—Chester T. Barry
(74) *Attorney, Agent, or Firm*—Lerner, David, Littenberg, Krumholz & Mentlik, LLP

(57) ABSTRACT

Processes for the treatment of organic waste are disclosed comprising digesting organic waste under anaerobic conditions so as to convert at least a portion of the organic waste and produce a clear decant and a mixture of biomass and unconverted organic compounds, returning at least a portion of the mixture of biomass and unconverted organic compounds to the digesting step so as to control the system net growth rate therein, partially oxidizing at least a portion of the mixture of biomass and unconverted organic compounds to produce a conditioned effluent therein, and returning the conditioned effluent to the digesting step.

56 Claims, 5 Drawing Sheets

BIOLOGICAL PROCESS FOR WASTE TREATMENT AND ENERGY PRODUCTION

CROSS-REFERENCE TO RELATED APPLICATIONS

The present provisional patent application includes this document and U.S. patent application Ser. No. 09/691,816 filed Oct. 19, 2000, which is hereby incorporated by reference herein.

FIELD OF THE INVENTION

The present application relates to improved processes and systems for the treatment of organic waste. More particularly, the present invention relates to processes for improving the biodegradation of organic waste, and to organic waste treatment processes that produce gaseous byproducts that are captured and used for energy production within or outside of the waste treatment system.

BACKGROUND OF THE INVENTION

There are, of course, many patents which relate to the treatment of biochemical waste and to processes for anaerobic digestion of biochemical waste materials. Efforts have, in fact, centered upon elimination of the extent of pollution created by these systems, and to methods for enhancing these anaerobic treatment systems to increase their overall efficiency. For example, in Ishida et al., U.S. Pat. No. 4,067,801, there is disclosed a two-stage anaerobic treatment system in which a solid separation step is provided between a first acidogenic stage and a second methanogenic stage, with the solids being recycled to the acidogenic reactor. Solids from the methanogenic reactor are then separated from the effluent and a portion is returned to the methanogenic reactor, with the remainder disposed of as a waste stream. Similarly, in Srivastava, U.S. Pat. No. 5,500,123, another two-stage anaerobic digestion system is disclosed, which includes partial recycle of solids from the methanogenic stage to the acidogenic stage.

Furthermore, in Kubler, U.S. Pat. No. 5,529,692, yet another two-phase anaerobic treatment is disclosed in which biosolids are recycled and are conditioned prior to being added to the methanogenic reactor. As is disclosed in Kubler, this conditioning is a biological hydrolysis step requiring pH control within a critical range, and solids retention times on the order of three days. The conditioning step in Kubler is said to promote methane generation in a second phase of the anaerobic reactor.

In other patents, there has been a general recognition that electrolysis is a method for reducing the organic content of waste streams per se. Thus, for example, in Ghosh et al., U.S. Pat. No. 4,696,746, the acidogenic effluent from a two-stage anaerobic reactor system is divided into two steams for treatment in separate methanogenic reactors. One of these streams is enriched in molecular hydrogen to promote the generation of methane and to minimize carbon dioxide evolution. Thus, the object of this process is to increase the overall generation of methane by the anaerobic treatment process, and the patentees disclose recycle of biosolids into the reactor system for use of an electrolytic process to facilitate digestion of biosolids generated by the anaerobic stages. Similarly, in Dietrich, U.S. Pat. No. 5,364,509, black water and gray water sewage are treated in electrolytic cells. This electrolysis is said to be sufficient to reduce the biological oxygen demand (BOD) and total suspended solids (TSS) of the waste water to levels suitable for surface water discharge. The process disclosed in this patent uses an electrolysis cell as the sole treatment unit and does not discuss integration of electrolysis into a more comprehensive treatment system.

In Roychowdhury, U.S. Pat. No. 6,090,266, processes are disclosed for producing hydrogen from anaerobic decomposed organic materials. These organic materials are thus subjected to anaerobic decomposition under acidogenic conditions and then treated with an anaerobic reactor comprising an electrolytic cell. After current application in the cell, methane generation is suppressed and hydrogen production increased. Thus, upon termination of the electric current, methane generation resumes.

In other patents, the use of electrolysis to facilitate biodegradation of certain cellulosic materials is also disclosed, such as in Eskamani et al., U.S. Pat. No. 4,341,609, and Magnier et al., U.S. Pat. No. 695,573, which disclose electrolysis used to facilitate biological conversion of plant biomass.

Furthermore, in my own prior U.S. Pat. No. 5,492,624, which is an improvement over my prior U.S. Pat. Nos. 4,915,840 and 5,141,646, I disclose a process for treating organic waste by feeding the waste to an autothermal aerobic digestion unit where it is subjected to biological digestion, and in which at least a portion of the biomass produced therein is oxidized, preferably by chemical oxidation step, such as using hydrogen peroxide in the presence of a centens reagent catalyst, such as ferrous sulphate, and then returning the oxidized effluent to the autothermal aerobic digestion unit itself.

Efforts have continued, however, to improve on all of these processes and to further reduce the generation of unwarranted pollutants from said biological processes.

SUMMARY OF THE INVENTION

In accordance with the present invention, these and other objects have now been realized by the invention of a process for the treatment of organic waste comprising digesting the organic waste under anaerobic conditions so as to convert at least a portion of the organic waste and produce a clear decant and a mixture of biomass and unconverted organic compounds, returning at least a first portion of the mixture of biomass and unconverted organic compounds to the digesting step so as to control the system net growth rate therein, partially oxidizing at least a second portion of the mixture of biomass and unconverted organic compounds to produce a conditioned effluent therein, and returning the conditioned effluent to the digesting step. In a preferred embodiment, the process includes digesting the at least a second portion of the mixture of biomass and unconverted organic compounds under anaerobic conditions to produce gaseous carbon compounds, a second clear decant and a second mixture of biomass and converted organic compounds, and feeding the second mixture of biomass and unconverted organic compounds to the partially oxidizing step. Most preferably, the process includes separating the second clear decant from the second mixture of biomass and unconverted organic compounds. More preferably, the process includes monitoring the oxidation reduction potential (ORP) of the conditioned effluent and adding oxidant to the partially oxidizing step to maintain the ORP at a predetermined level.

In accordance with a preferred embodiment of the process of the present invention, the partially oxidizing step comprises electrolysis.

In accordance with another embodiment of the process of the present invention, a process is provided for the treatment of organic waste comprising contacting the organic waste with anaerobic acidogenic microorganisms so as to convert at least a portion of the organic waste and produce an acidic effluent comprising a biomass, acidic organic compounds and unconverted organic compounds, contacting the acidic effluent with anaerobic methanogenic microorganisms so as to convert at least a portion of the acidic effluent to gaseous carbon compounds and produce a clear decant and a mixture of biomass and unconverted organic compounds, subjecting at least a portion of the mixture of biomass and unconverted organic compounds to electrolysis to produce a conditioned effluent therein, and recycling the conditioned effluent to the contacting of the organic waste with the anaerobic acidogenic microorganisms. In a preferred embodiment, the process comprises generating molecular hydrogen during the electrolysis and introducing the molecular hydrogen during the contacting of the acidic effluent with the anaerobic methanogenic microorganisms to facilitate conversion of the acidic effluent to methane.

In accordance with another embodiment of the process of the present invention, the process is integrated with a fermentation process, the fermentation process comprising fermenting a feed comprising plant matter to produce a fermented feed and separating the fermented feed into a product stream, a waste fermentation effluent and waste solids, the waste fermentation effluent comprising organic waste material, the process including subjecting the waste solids to electrolysis so as to produce conditioned waste solids, and contacting the conditioned waste solids with the anaerobic acidogenic microorganisms. In a preferred embodiment, the electrolysis comprises a first electrolysis step, the process including subjecting the feed comprising plant matter to a second electrolysis step before fermenting the feed, thereby generating hydrogen, and introducing the hydrogen to the contacting of the acidic effluent with the anaerobic methanogenic microorganisms in order to facilitate conversion of the acidic effluent to methane.

In accordance with another embodiment of the process of the present invention, the contacting of the organic waste with the anaerobic acidogenic microorganisms is carried out at a temperature of from about 30 to 70° C.

In accordance with another embodiment of the process of the present invention, the contacting of the organic waste with the anaerobic acidogenic microorganisms is carried out at a hydraulic retention time of from about 1 to 24 hours. In accordance with another embodiment of the process of the present invention, the contacting of the organic waste with the anaerobic acidogenic microorganisms is carried out at a solid retention time of from about 1 to 72 hours.

In accordance with another embodiment of the process of the present invention, the contacting of the acidic effluent with the anaerobic methanogenic microorganisms is carried out at a temperature of from about 30 to 70° C.

In accordance with another embodiment of the process of the present invention, the contacting of the acidic effluent with the anaerobic methanogenic microorganisms is carried out at a hydraulic retention time of from about 1 to 100 days.

In accordance with another embodiment of the process of the present invention, the contacting of the acidic effluent with the anaerobic methanogenic microorganisms is carried out at a solid retention time of from about 1 to 1,000 days.

In accordance with another embodiment of the process of the present invention, the process includes separating the clear decant from the mixture of biomass and unconverted organic compounds. Preferably, the separating is carried out using a gravity settling tank.

In accordance with another embodiment of the process of the present invention, the process includes subjecting at least another portion of the mixture of the biomass and the unconverted organic compounds to contact with the acidic effluent.

In accordance with another embodiment of the process of the present invention, the process includes reducing the particle size of the at least a portion of the mixture of the biomass and unconverted organic compounds.

In accordance with another embodiment of the process of the present invention, the process includes monitoring the ORP of the conditioned effluent and controlling the oxidant produced in the electrolysis step to maintain the ORP at a predetermined level.

In accordance with another embodiment of the process of the present invention, the process includes separating the clear decant from the mixture of biomass and unconverted organic compounds. Preferably, the separating of the clear decant from the mixture of biomass and unconverted compounds is carried out by means of a gravity settling tank.

In accordance with the present invention, a process is provided for the treatment of organic waste comprising contacting the organic waste with anaerobic acidogenic microorganisms so as to convert at least a portion of the organic waste and produce a first clear decant comprising organic acids and a first mixture of biomass and unconverted organic material therein, returning at least a portion of the first mixture of biomass and unconverted organic material to the contacting of the organic waste with the anaerobic acidogenic microorganisms, contacting the first clear decant with anaerobic methanogenic microorganisms so as to convert at least a portion of the organic acids to gaseous carbon compounds and produce a second clear decant and a second mixture of biomass and unconverted organic compounds, returning at least a portion of the second mixture of biomass and unconverted organic material to the contacting of the first clear decant with the anaerobic methanogenic microorganisms, subjecting at least a portion of the first mixture of biomass and unconverted organic material and a portion of the second mixture of biomass and unconverted organic material to electrolysis to produce a conditioned effluent therein, and returning the conditioned effluent to contact the anaerobic acidogenic microorganisms so as to control the system net growth rate thereof. In a preferred embodiment, the process includes separating at least a portion of the first clear decant by means of a membrane system to allow organic acids having molecular weights below a desired molecular weight to pass therethrough in preference to organic acids having molecular weights above the desired molecular weight, and passing the organic acids passing through the membrane system to contacting with the anaerobic methanogenic microorganisms.

In accordance with another aspect of the present invention, a process has been provided for the treatment of organic waste comprising digesting organic waste in the presence of microorganisms so as to convert at least a portion of the organic waste and produce a clear decant and a mixture of biomass and unconverted organic compounds, producing an oxidizing agent by subjecting an aqueous feed stream containing an oxidizing agent precursor to electrolysis so as to produce a stream of oxidizing agent, partially oxidizing at least a portion of the mixture of biomass and unconverted organic compounds with the stream of oxidizing agent to produce a conditioned effluent therein, and returning the conditioned effluent to the digesting step. In a preferred embodiment, the process includes returning at least a first portion of the mixture of biomass and unconverted organic compounds to the digestion step so as to control the system net growth rate therein, wherein the at least a portion of the mixture of biomass and unconverted organic compounds comprises a second portion of the mixture of biomass and unconverted organic compounds.

In accordance with one embodiment of the process of the present invention, the digesting of the organic waste is carried out under aerobic or anaerobic conditions.

In accordance with another embodiment of the process of the present invention, the oxidizing agent precursor comprises an acid, preferably an acid such as hydrochloric acid, nitric acid, sulfuric acid, or the like.

In accordance with another embodiment of the process of the present invention, the stream of oxidizing agent has an ORP of between about +300 mv and +1400 mv, and preferably the oxidizing agent has a ph of between about 0 and 14, and most preferably between about 2 and 12.

In accordance with another embodiment of the process of the present invention, the stream of oxidizing agent comprises a first stream from the electrolysis step and the process includes producing a second neutralizing stream from the electrolysis step. Preferably, the second neutralizing stream has an ORP of between about −400 mv and −800 mv, and most preferably the neutralizing stream has a pH of between about 4 and 14, preferably between about 2 and 12.

In accordance with another embodiment of the process of the present invention, the process includes adding the second neutralizing stream to the conditioned effluent.

In accordance with the process of the present invention, a process is also provided for the treatment of organic waste comprising digesting the organic waste under anaerobic conditions so as to convert at least a portion of the organic waste and produce a clear decant and a mixture of biomass and unconverted organic compounds, returning at least a first portion of the mixture of biomass and unconverted organic compounds to the digesting step so as to control the system net growth rate therein, producing an oxidizing agent by electrolysis of an aqueous feed stream, partially oxidizing at least a second portion of the mixture of biomass and unconverted organic compounds with the oxidizing agent to produce a conditioned effluent therein, and returning the conditioned effluent to the digesting step. Preferably, the feed stream comprises an acid, such as nitric acid, hydrochloric acid, sulfuric acid, and the like, and/or a salt, such as sodium chloride (or other brine solutions), which produces a anion in the electrolysis step, such as chloride ion, as the oxidizing agent therein.

In accordance with another embodiment of the process of the present invention, the oxidizing agent has an ORP of between about +300 mv and +1400 mv, and preferably the oxidizing agent has a pH of between about 0 and 14, and most preferably between about 2 and 12.

In accordance with another embodiment of the process of the present invention, the process includes providing a neutralizing stream from the electrolysis. Preferably, the neutralizing stream has an ORP of between about −400 mv and −800 mv, and most preferably the neutralizing stream has a pH of between about 4 and 14, preferably between about 2 and 12.

In accordance with another embodiment of the process of the present invention, the process includes returning the neutralizing stream to the conditioned effluent.

In accordance with another embodiment of the process of the present invention, the process includes digesting at least a second portion of the mixture of biomass and unconverted organic compounds under anaerobic conditions to produce gaseous carbon compounds, a second clear decant and a second mixture of biomass and unconverted organic compounds, and feeding the second mixture of biomass and unconverted organic compounds to the partially oxidizing step. In a preferred embodiment, the process includes separating the second clear decant from the second mixture of biomass and unconverted organic compounds. More preferably, the process including monitoring the ORP of the conditioned effluent and adding oxidant to the partially oxidizing step to maintain the ORP at a predetermined level.

In accordance with the disclosed processes organic waste and biomass are converted to energy-rich gaseous products, such as methane and hydrogen. Conversion rates are increased beyond those attained in conventional processes, reducing net biomass sludge production across the system to values near zero, while at the same time increasing the production of methane.

One aspect of the present invention relates to methods for improving the biodegradability of organic waste by feeding such waste to a two-phase anaerobic reactor system; subjecting the organic waste to digestion to produce gaseous carbon compounds, a clear decant and a mixture of biomass and unconverted organic compounds; contacting at least a portion of the biomass and unconverted organic compounds with oxidants in a separate chemical reactor to produce a conditioned effluent or recycle stream therein; and returning the conditioned effluent to the anaerobic treatment system. Preferably, the two-phase anaerobic system comprises a first reactor containing facultative acid-forming microorganisms that is operated to produce an acidic effluent comprising biomass, acidic organic compounds and unconverted organic compounds. The acidic effluent is then fed to a second reactor containing anaerobic methane-forming microorganisms and is digested to convert at least a portion of the acidic effluent to gaseous carbon compounds, producing a clear decant stream and a mixture of biomass and unconverted organic compounds. A first portion of the mixture is recycled to the second anaerobic reactor to control the net growth rate of biomass within the second reactor. A second portion of the mixture is subjected to chemical treatment and returned to the first anaerobic reactor. Preferably, the chemical treatment step comprises the generation of hydroxy radicals through electrolysis of the aqueous portion of the recycled mixture of biomass and organic material to produce the conditioned effluent. This chemical treatment step converts the biomass and organic compounds through hydrolysis and partial oxidation into compounds of smaller molecular weight that can be more readily degraded in the anaerobic reactor system.

In a related embodiment of the present invention, an additional solids separation step is included between the first, acid-forming, reactor and the second, methane-forming, reactor. The acidic effluent from the first reactor is thereby separated into a mixture of biomass and unconverted organic compounds and a decant which preferentially includes the smaller molecular weight acidic organic compounds formed in the first reactor. A portion of the biomass/organic waste mixture from the solids separation step is recycled to the first reactor to control the growth rate of facultative acid-forming organisms therein. The second reactor is operated so as to produce a clear decant and a second mixture of biomass and unconverted organic substances. A portion of this second mixture is recycled to the second reactor and the remainder of the mixture is conditioned in a chemical treatment step as described above. The recycling of the biomass/organic waste mixtures to their respective reactors is performed so as to control the overall net growth rate of biomass within the system.

In another aspect, the present invention relates to the capture and beneficial use of high-energy gases produced by the various steps in the anaerobic treatment system. In a preferred embodiment, molecular hydrogen generated by the electrolysis process is captured and introduced to the methane-forming reactor to increase the overall conversion of organic compounds to methane in preference to other gaseous carbon-containing compounds such as carbon dioxide.

A third aspect of the present invention relates to the integration of an anaerobic reactor system and chemical treatment step as described above with a conventional microbiological process, such as an ethanol fermentation process comprising the steps of fermenting a feed comprising plant matter and separating the fermented feed into a product stream (ethanol), waste fermentation effluent and waste solids. The fermentation effluent is fed to the first stage of the anaerobic reactor system as organic waste. The waste solid stream, primarily comprising lignin and cellulosic material, is fed directly to the chemical treatment unit where it combines with the recycled biomass and unconverted organic waste and is conditioned as described above before being fed to the first anaerobic reactor.

Another aspect of the present invention relates to the integration of an electrolysis step system for generating an oxidizing agent into an overall system for the treatment of organic waste material with such an oxidizing agent. Thus, the oxidizing agent produced in such an electrolysis step is then used directly in the chemical treatment of a portion of the biomass and unconverted organic compounds produced in various digestion processes, be they aerobic, anaerobic, thermophilic, or the like. In this system, the electrolysis unit is not used to directly contact the biomass, but instead to produce an oxidizing agent, which is an aggressive high ORP solution for contact with recycled biomass and/or unconverted organic material. One advantage of such a process is that a second stream can be produced at this same time in the electrolysis unit, and this second stream can have additional utility in the system. For example, this second stream can be a neutralizing stream having a low ORP value and a high pH, and can thus be used to neutralize the recycle stream for return to the digester itself.

A final aspect of the present invention relates to the integration of components described herein to create a two-phase anaerobic treatment system with a chemical oxidation step that maximizes the conversion of organic wastes and biomass to gaseous carbon-containing compounds resulting in zero net biomass production throughout the system.

DETAILED DESCRIPTION

Figure 1:
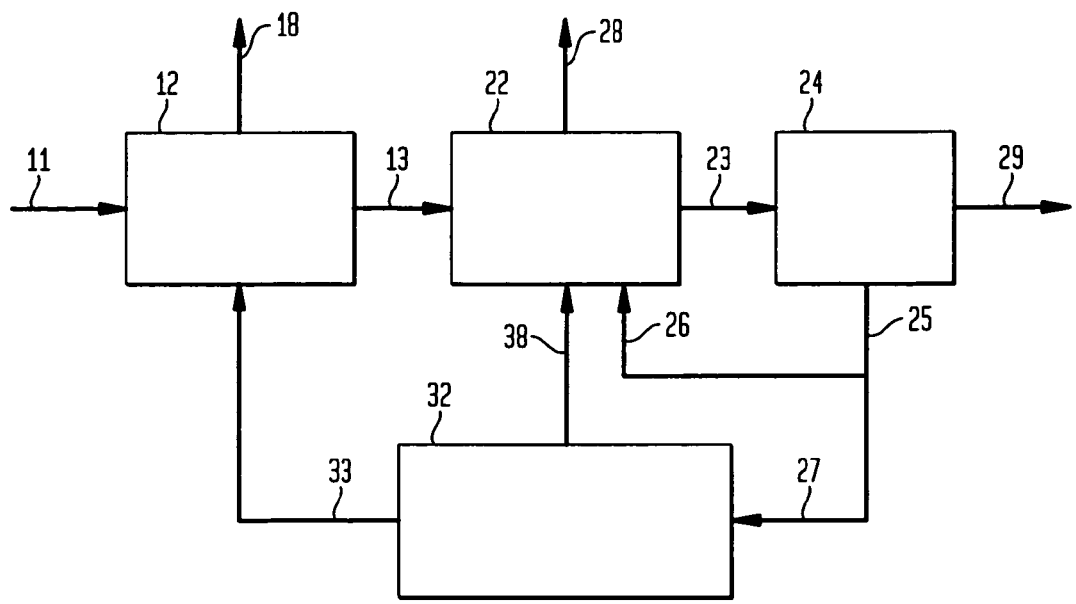
FIG. 1 is a block diagram of a two-phase anaerobic treatment system according to the preferred embodiments of the present invention.

As used in the present disclosure, "a biological treatment process" or "biological treatment" specifically means an anaerobic or acid phase anaerobic process unless otherwise provided in a specific section of the disclosure.

Anaerobic processes involve the biological decomposition of organic matter in the absence of molecular oxygen, and have most commonly been used to digest biomass, but have also been used in suspended-solids contact processes to stabilize high-strength soluble wastes. Anaerobic processes typically rely on microorganisms that convert organic compounds to gaseous carbon compounds, predominantly methane and carbon dioxide.

Acid phase anaerobic processes involve the biological decomposition of organic and inorganic matter in which the microorganisms are indifferent to the presence or absence of oxygen. Typically, these processes are used as a first phase of a two-phase anaerobic treatment process is an acid-forming, or "acidogenic", process wherein large organic molecules are broken down and partially oxidized to form lower molecular weight organic acids. Little or no methane production occurs in this reactor.

"Respiration" as used in this disclosure is the measure of cellular metabolic activity in the biosolids, specifically, of the rate at which the microorganisms in the biosolids convert organic materials in the process stream to a gaseous form.

As used in the present disclosure, "chemical oxygen demand" (COD) is an expression of the amount of oxygen that is theoretically necessary to convert the combined biosolids and organic waste streams to carbon dioxide. COD is used as a measure of the total amount of carbon available in the system for conversion to gaseous carbon compounds.

"Electrolysis", as used in the present disclosure, refers to the disassociation of water to form hydroxy radicals by applying an electromotive potential across a portion of an aqueous stream. In the present invention, a portion of the waste stream may be electrolyzed directly, water-containing brines or other such additives (for the creation of anionic oxidizing agents) may be electrolyzed directly and added to the waste stream, or a combination of electrolysis and chemical addition may be employed.

As used in the present disclosure, the "oxidation-reduction potential" (ORP) of a mixture, such as a biosolids/organics mixture, is a measure of the potential of the mixture to drive oxidizing or reducing reactions. ORP is expressed in units of electromotive force, typically in millivolts (mV), with a positive quantity indicating the tendency to drive oxidizing reactions and a negative quantity indicating a tendency to drive reducing reactions.

The present invention employs biological treatment and chemical treatment in an integrated system to convert COD in organic waste streams to gaseous carbon compounds, primarily methane, with essentially zero net sludge production. Generally, the process for the biological treatment of waste according to the present invention includes subjecting the organic waste to biological digestion for a predetermined time and transferring at least a portion of the resulting mixture of biosolids and unconverted organic material to a chemical treatment unit where it is converted to partially-oxidized compounds that can be more readily degraded in the anaerobic reactors. Preferably, this conversion is performed by subjecting the mixture to electrolysis in the chemical treatment unit. The addition of chemical compounds to the reactor in combination with, or in place of, electrolysis is also within the scope of the invention.

FIGS. 1-6 present selected embodiments of the present invention. It should be understood that, unless otherwise indicated, the specific details set forth are merely illustrative and not meant to be limiting. Certain features, such as locations and types of monitoring points, storage vessels, and equipment for flow control and equalization, are omitted for clarity. Their arrangement and integration in the systems and processes of the present invention would be known to one skilled in the art. Moreover, although the selected embodiments are presented as continuous processes, the invention may be readily adapted to batch and semi-continuous processes and various reactor designs by techniques that are well known in the relevant arts.

One aspect of the invention relates to methods for improving the biodegradable organic waste by subjecting the waste to anaerobic digestion and chemical oxidation. A preferred embodiment of this aspect of the present invention, illustrated in FIG. 1, comprises a two-phase reactor system 12, 22, a biosolids separation unit 24 and a chemical treatment unit 32. An aqueous stream 11 containing organic material is discharged to bioreactor 12 for biological treatment. Bioreactor 12 also receives effluent stream 33 from chemical reactor 32. Streams 11 and 33 may be discharged individually to bioreactor 12 or may be combined at a point upstream of the bioreactor and discharged as a mixed stream. Bioreactor 12 contains a biomass, preferably comprising anaerobic acidogenic microorganisms, and is operated to convert at least a portion of the organic material from streams 11 and 33 to produce an acidic effluent comprising biomass, acidic organic compounds and unconverted organic compounds. Preferred operating parameters for these acidogenic reactors include temperatures of from about 30 to 70° C., hydraulic retention times (HRT) of from about 1 to 24 hours, and solids retention times (SRT) of from about 1 to 72 hours.

The acidic effluent 13 is fed to bioreactor 22 which contains anaerobic methane-forming microorganisms and is operated to convert at least a portion of the acidic effluent 13 to form gaseous carbon compounds, primarily carbon dioxide and methane, and a mixture of biomass and unconverted organic compounds. The gaseous compounds may be discharged as stream 28 or captured for beneficial use, e.g., as a fuel gas. Preferred operating parameters for these methanogenic reactors include temperatures of from about 30 to 70° C., hydraulic retention times of from about 1 to 100 days, and solid retention times of from about 5 to 1,000 days.

The reactor contents 23, containing biosolids and unreacted organic material, are discharged to a separation unit 24 where reactor contents 23 are separated into an effluent stream 29 and a biosolids underflow 25. Preferably, separation unit 24 is a gravity settling tank where biosolids and treated effluent separate as two or more layers because of their differing densities. Other solids separation processes known to the art may be used, including, for example, membrane separation, dissolved air flotation (DAF), cavitation air flotation (CAF), or ballasted flocculation (BFR).

Excess foam produced in the bioreactors 12, 22 may be transferred directly to the chemical treatment 32 for further processing (not shown). The clear effluent 29 is drawn off from the separation unit 24 for discharge or further treatment (not shown). Stream 25, containing biosolids and unreacted organics, is divided into streams 26 and 27 for recycle or treatment within the system. In some applications, the functions of bioreactor 22 and separation unit 24 may be performed by a single unit.

Preferably, stream 25 is subjected to particle size reduction to create biosolids particles of a known size distribution in streams 26 and 27, thereby improving the efficiency of subsequent treatment. Particle size reduction is discussed in more detail in U.S. patent application Ser. No. 09/691,816.

A portion 27 of biosolids/organics stream 25 is discharged to chemical treatment unit 32 where the biosolids and unreacted organic material are partially oxidized. The chemical treatment process improves the biodegradability of the waste, increasing the rates at which the organic material may be converted to low-molecular-weight organic acids in bioreactor 12 and, subsequently, to gaseous carbon compounds in bioreactor 22. In accordance with the preferred embodiment of the invention, the quality of effluent 33 and the efficiency of the biological process are controlled by monitoring the ORP of the effluent 33 and adding oxidant as needed to maintain the selected ORP. Because ORP is used as a control parameter, the addition of oxidant may be automated to operate independently of the specific oxidants that are being added. In accordance with this approach, chemical oxidants can be added in response to real-time measurements of chemical activity rather than by adding chemical oxidant in a predetermined ratio to the estimated COD of the mixture. The use of an oxidizing agent at relatively high temperatures converts the cellular material and unreacted organics in the biosolids to more soluble forms that, consequently, are more readily biodegradable. By controlling to a selected ORP level, the rate of chemical addition can be varied to solubilize organics to the optimum degree to control effluent quality and decrease rates of chemical usage more effectively than is allowed by controlling the stoichiometric ratio of oxidants to COD. Preferred operating parameters for these chemical reactors include temperatures of from about 30 to 300° C., hydraulic retention times of from about 15 to 1,000 minutes, and ORP levels of from about +50 MV to +800 MV. Ultimately, however, the preferred conditions for chemical treatment will be determined by optimal enhancement of gas production that is achieved with the chemical treatment of the recycled biosolids and undegraded organic waste material. It will therefore be apparent to those of skill in this art that the conditions within these chemical reactors will not permit any significant biological reaction to occur therein.

Preferably, the oxidizing agent is created in situ by electrolysis of water to produce hydroxy radicals. Electrolysis may be used alone or in combination with chemical oxidants to increase the ORP of the waste stream to the desired levels. Preferably, the water in a portion of the waste is electrolyzed by applying a direct current across an array of electrodes in a contact chamber in reactor 32. A stable direct current, sufficient to generate the desired rate of electrolysis, is applied at current densities in a range of about 10 to about 120 amps. As a portion of the waste 27 flows through the chemical reactor 32, water molecules are dis-associated to form free radicals of hydrogen and oxygen which recombine to form primarily hydroxy radicals and molecular hydrogen. The hydroxy radicals react with the organic materials in the biomass/organics mixture, facilitating hydrolysis and partial oxidation of the biosolids and unreacted organic compounds. The molecular hydrogen may be discharged through line 38 to anaerobic bioreactor 22 to increase the rate of formation of methane relative to carbon dioxide. Alternatively, the molecular hydrogen may be discharged or collected for other uses, e.g., electricity generation in a fuel cell. One mechanism for the formation of methane in such anaerobic processes involves two species of microorganisms. Once set of microbes generates hydrogen while another set of microbes utilizes the hydrogen and carbon dioxide to produce methane. Hydrogen is frequently a limiting factor in the production of methane. Introducing hydrogen which is generated by the electrolysis unit thus facilitates the production of more methane by the anaerobic reactor and lowers the amount of carbon dioxide which assists the reactor in maintaining alkaline conditions therein. The resulting biogas is thus rich in methane and lower in carbon dioxide content, and thus has greater energy (BTU) value.

After treatment in chemical treatment unit 32, the resulting conditioned effluent 33 is, preferably, returned to the head of the process, i.e., bioreactor 12, where it is mixed with aqueous waste stream 11 and subjected to further treatment. Optionally, grit or other heavy inorganic particles may be removed from effluent 33 before effluent 33 is returned to bioreactor 12. Alternatively, such materials may be allowed to accumulate in bioreactor 12 and periodically removed from the system. Suitable degritting or inorganic grit removal techniques will be recognized and understood by those having ordinary knowledge in the art.

Figure 2:
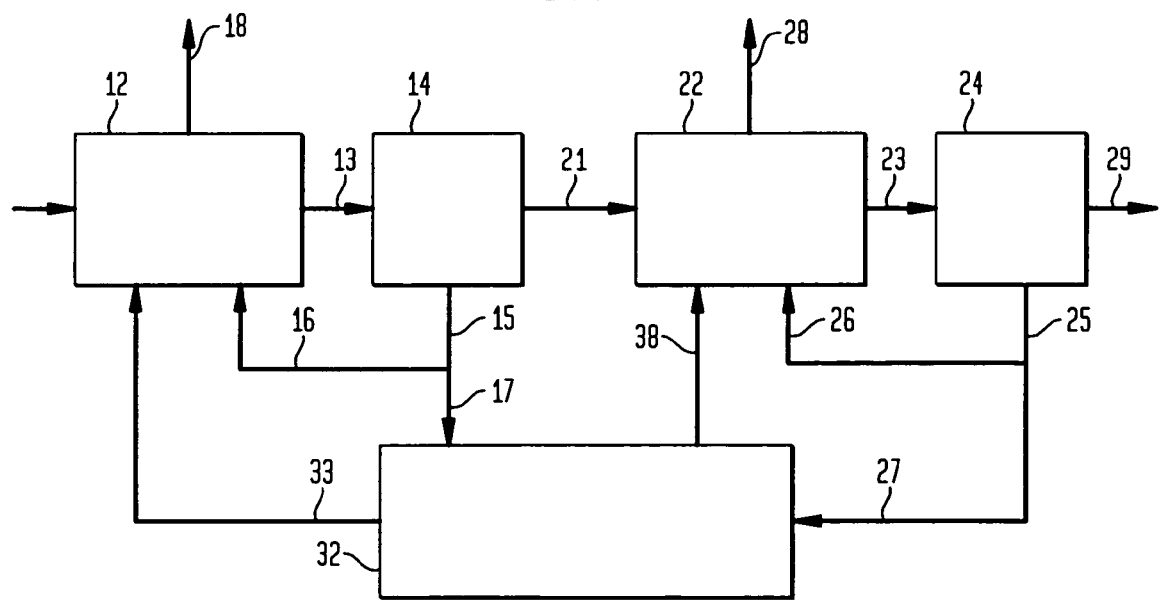
FIG. 2 is a block diagram of a two-phase anaerobic treatment system with an internal biosolids recycle step according to another preferred embodiment of the invention.

The embodiment of FIG. 2 provides an additional solids separation unit 14 between the first, acid-forming, reactor and the second, methane-forming, reactor. The acidic effluent from the first reactor is thereby separated into a mixture 15 of biomass and unconverted organic compounds and a decant 21 which includes the smaller molecular weight acidic organic compounds formed in the first reactor. A portion 16 of the biomass/organics mixture 15 is recycled to the first reactor 12 to control the growth rate of facultative acid-forming organisms therein. The remaining portion 17 of stream 15 is discharged to the chemical reactor 32. Solids separation unit 14 may comprise any of the unit operations discussed in respect to solids separation unit 24. In preferred embodiments of the present invention, separation unit 14 is a membrane system designed to allow molecules below a specific molecular weight to be passed to bioreactor 22 in stream 21. Preferential separation of low molecular weight organic acids into stream 21 provides a substrate that is more readily metabolized to gaseous carbon compounds than the mixture of biosolids and partially degraded compounds present in stream 13. Moreover, providing a separate recycle stream to each of the reactors 12, 22 allows more flexibility in controlling the rate of conversion of biomass to gaseous carbon compounds than does the single recycle stream 26 in the embodiment of FIG. 1.

Figure 3:
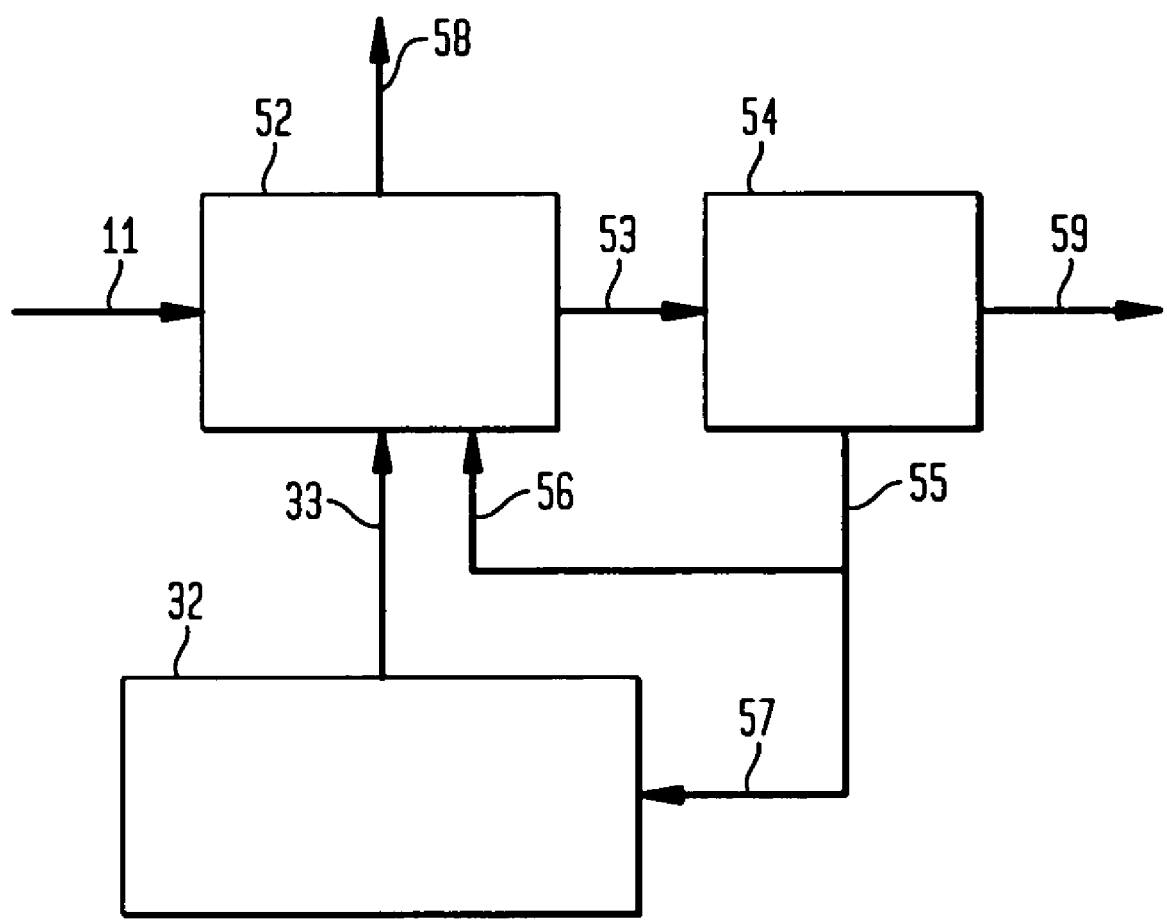
FIG. 3 is a block diagram of an anaerobic treatment system wherein the two phases of the anaerobic treatment system are combined in a single reactor according to another preferred embodiment of the present invention.

In the preferred embodiment illustrated in FIG. 3, both the acid-forming and methane-forming stages are carried out in one reactor 52. Organic waste 11 combines with effluent 33 from the chemical reactor 32 in bioreactor 52. Gases produced by the acid-forming and methane-forming reactions are discharged as stream 58. The mixed effluent 53, comprising low molecular weight compounds, unreacted organic substances and biomass, is discharged to separation unit 54 which separates the mixture to an effluent 59 and an underflow 55 comprising biomass in unreacted organic compounds. A portion 56 of stream 55 is recycled to the bioreactor 52 to control the net growth rate of biomass within the system. A second portion 57 of stream 55 is treated within the chemical reactor 32. Chemical treatment preferably comprises hydrolysis and partial oxidation of the biomass and unreacted organic compounds, as discussed with regard to the embodiments of FIG. 1 and FIG. 2. The advantages of combining the acid phase and methane phase in one reactor is generally to simplify operation. The decision as to whether or not to utilize a one-stage or a two-stage system will generally depend upon the size of the system and associated economics of scale thereof.

In another aspect of the invention, gases produced during the waste treatment process are captured and put to beneficial use, e.g., to produce energy that may be used to operate the system. For example, the anaerobic organisms in a typical methane-forming reactor such as bioreactor 22 convert organic compounds to single-carbon gases, primarily methane and carbon dioxide. This gas may be captured and utilized for its fuel value. The molecular hydrogen produced during the electrolytic process in chemical reactor 32 may be injected into bioreactor 22, increasing the rate of production of methane relative to carbon dioxide, thereby producing a more energy-rich gas stream. Molecular hydrogen generated in chemical treatment unit 32 may also be diverted to other uses, such as the production of electricity in fuel cells.

Figure 4:
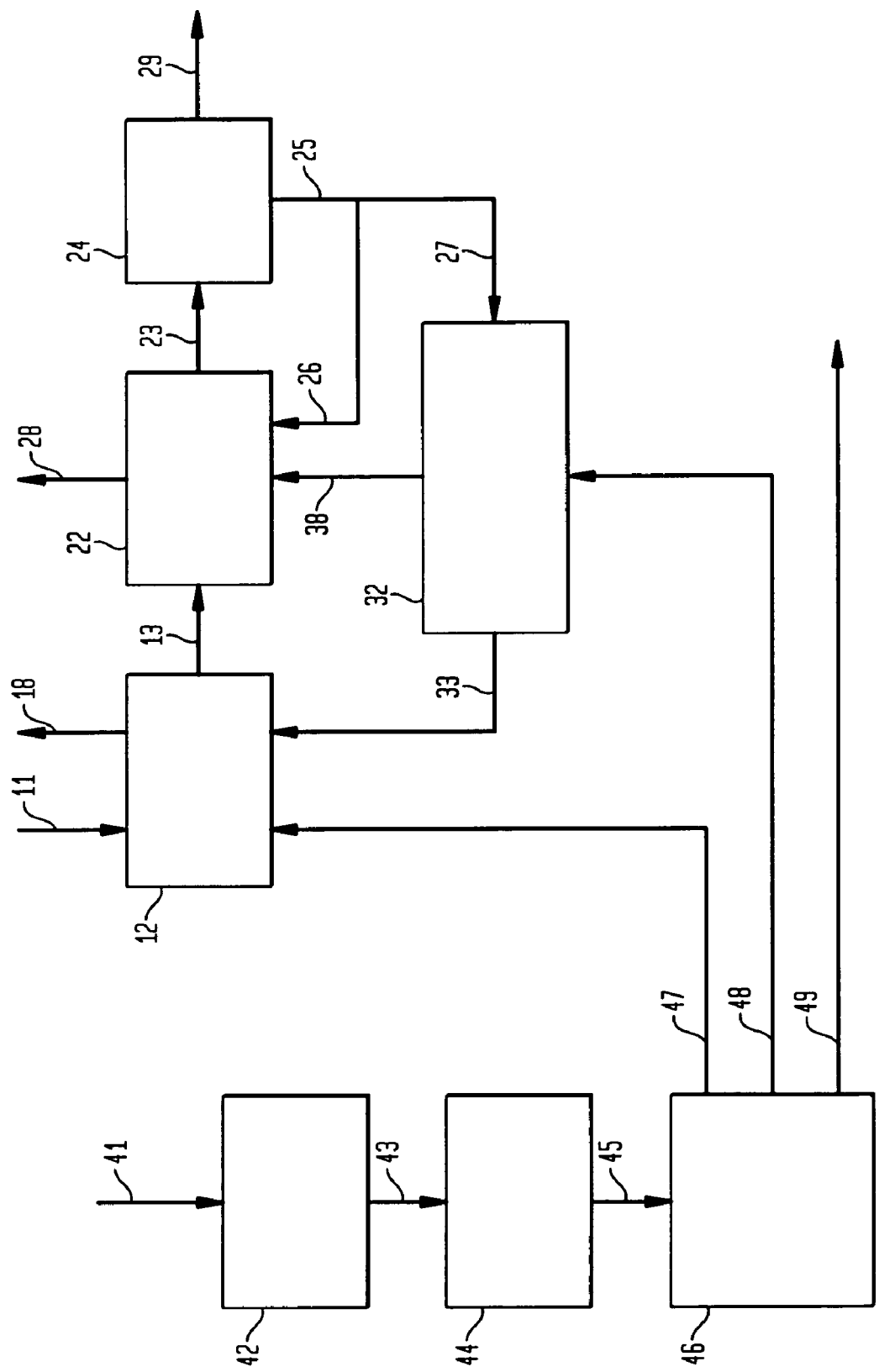
FIG. 4 is a block diagram of a two-stage anaerobic treatment system integrated with an ethanol fermentation system according to another preferred embodiment of the present invention.

In a third aspect of the invention, an anaerobic reactor system and chemical treatment step (e.g., a system such as described in the embodiments of FIG. 1, FIG. 2 or FIG. 3) is integrated with an existing chemical manufacturing process system that produces at least one organic waste stream. Preferably, the waste treatment system is provided as a "bolt-on" system, i.e., a system that can be added to an existing chemical process system with a minimum of modifications to the existing chemical production units. FIG. 4 illustrates the waste treatment system of the embodiment of FIG. 1 added to a conventional ethanol fermentation process 41-49.

In a preferred embodiment, feedstock 41, comprising plant matter for fermentation, is pretreated by hydrolysis in hydrolysis reactor 41, and the pretreated stream 43 is subjected to biological treatment, i.e., fermentation, in a fermentation unit 44, converting sugars in the pretreated stream 43 to ethanol, thereby producing a mixture 45 of ethanol, lignin and cellulosic materials derived from the plant matter. The mixture 45 is passed on to separation units 46 which separate the ethanol as a product stream 49 and produce an aqueous fermentation effluent 47 which is rich in organic matter, and a slurry 48 composed primarily of water, spent lignin and cellulosic material. The fermentation effluent 47 is fed to the first stage, acid-forming reactor 12, for conversion to low-molecular weight organic acids. Slurry stream 48 is fed directly to chemical reactor 32 for hydrolysis, preferably, by electrolysis of the waste streams 48 and 27 entering the chemical reactor unit 32. Hydrolysis of the feedstock 41 in reactor 42 may be performed by electrolysis of the feedstock. Molecular hydrogen generated by electrolysis in chemical reactor 32 or reactor 42 may be fed to the second stage, methane-forming reactor to increase the rate of methane production. The addition of an anaerobic reactor system with the chemical treatment step as described enables reduction or elimination of residual wastes from the chemical manufacturing process and increases net energy production by efficient utilization of the hydrogen and gaseous carbon compounds formed during waste treatment.

In another aspect of the present invention, the operating parameters of the anaerobic reactors and chemical reactor 32 are controlled to produce a net zero growth rate for biosolids across the system by maintaining a low net growth rate for the microorganisms in the anaerobic reactors 12, 22 and operating treatment unit 32 at conditions that effectively hydrolyze the additional biomass produced in bioreactors 12, 22.

Preferably, the rate of biosolids production is controlled to low levels by maintaining low system net growth rates, encouraging a high rate of conversion to gaseous carbon compounds. By maintaining the system net growth rate, $\mu_n$, at less than about 0.05 day$^{-1}$ and, more preferably, between about 0.01 day$^{-1}$ to about 0.006 day$^{-1}$ biodegradation is substantially increased relative to cell yield $Y_0$, thereby minimizing the re-circulation of organic carbon within the system and maximizing the conversion of organic matter to usable gaseous products. Any suitable method for maintaining a low system net growth rate may be used. In the present invention, it is preferred that portions 16, 26 of the biosolids/organic streams 15, 25 are returned to the respective bioreactors 12, 22 to control $\mu_n$, which is the inverse of the mean cell retention time, or "sludge age", $\theta_c$. Full biosolids retention in a biological treatment system maintains low $\mu_n$ values in the system. This provides the system with ecological inertia that results in low observed cell yields $Y_0$. It is essential to maintain low cell yields in a biological system that targets zero net volume solids or organic waste production, particularly if an ancillary chemical or physical treatment is utilized. The purpose of the chemical conditioning step is to render the targeted biosolids or waste materials biodegradable. When this biodegradable material is returned to the biological reactor after it is conditioned, it is essential that only a small fraction of the COD in the conditioned effluent be converted to biosolids. If reactor $\mu_n$ values are high, then $Y_0$ will be high, and a relatively large portion of chemically-conditioned material will be converted back to biosolids. Under such conditions, organic carbon essentially cycles repeatedly throughout the treatment system. Maintaining a low $Y_0$ means that the bulk of the organic carbon in the chemically-conditioned material is not converted to biosolids but is rather converted to gaseous compounds (e.g., carbon dioxide methane, hydrogen, etc.) and exits the system. A high rate of conversion is critical to keeping the overall system economics reasonable and avoiding inordinate or wasteful utilization of the chemical conditioning step. The operating conditions of the chemical reactor 32 can be adjusted to hydrolyze the small amounts of additional biomass formed in the anaerobic treatment reactors, resulting in zero net biomass production throughout the system.

Figure 5:
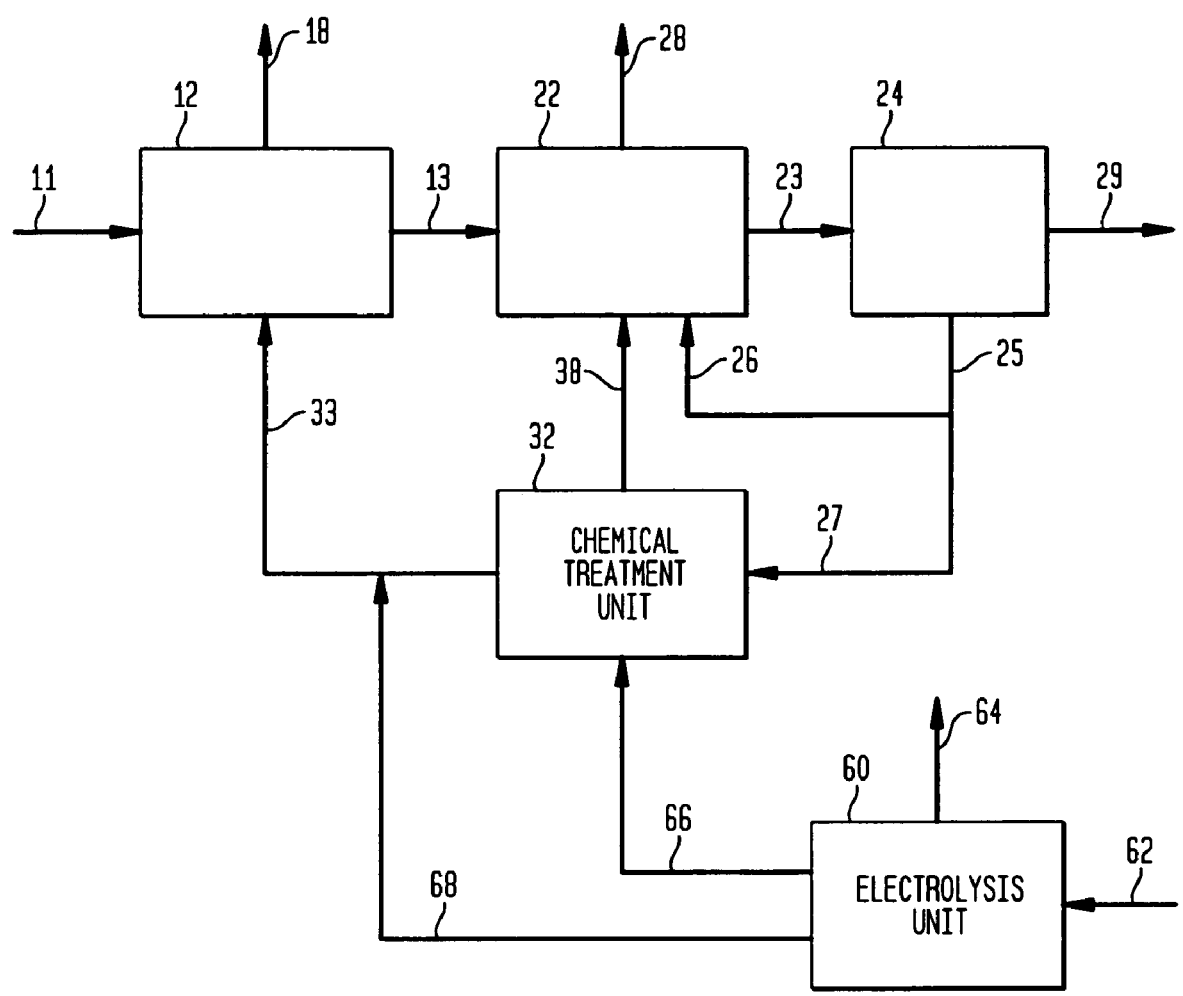
FIG. 5 is a block diagram of a two-phase anaerobic treatment system such as that shown in FIG. 1, integrated with an electrolysis unit for the production of oxidizing agent for use in the chemical treatment unit.

In another aspect of the present invention, as shown in FIG. 5, an electrolysis unit is incorporated into a method for improving biodegradable organic waste by subjecting the waste to anaerobic digestion and chemical oxidation employing the oxidant produced in the electrolysis step itself. As is shown in FIG. 5, a method similar to that shown in FIG. 1 is set forth, and the common reference numerals in FIG. 5 relate to the same elements shown in FIG. 1 and discussed in the specification. In the case of the system shown in FIG. 5, however, an electrolysis unit 60 is added to the system. In the electrolysis unit 60, an aqueous stream 62 is subjected to an electrolysis step in which the aqueous stream is electrolyzed by application of a direct current across an array of electrodes within the electrolysis unit 60. A stable direct current, sufficient to generate the desired rate of electrolysis, is applied at current densities in the range of about 10 to about 120 amps. In this case, however, as opposed to the in situ electrolysis discussed with respect to FIG. 1, the entrance stream 62 is preferably an acid-containing stream, including an acid such as nitric acid, sulfuric acid, hydrochloric acid, or the like. These materials, or oxidizing agent precursors, are electrolyzed in the manner discussed above. In this case, in addition to the hydroxyl ions discussed above, the oxidizing agent can include other anions such as chloride, nitrate or sulfate anions. These anions can also be provided by other salts, preferably such as sodium chloride, so as to provide an aqueous brine solution. These oxidizing agents are fed through line 66 into the chemical treatment unit 32 for contact with the portion of the biosolids and unconverted organic materials from stream 27.

The chemical treatment unit 32 thus operates in the same manner as is the case in the system shown in FIG. 1. Stream 66, carrying the oxidizing agent, is preferably a stream having a high ORP, generally between about +300 mv and +1400 mv, and preferably between about +800 mv and +1400 mv, most preferably greater than about 1000 mv. In addition, steam 66 also has a low pH, generally between about 0 and 5, more preferably between about 1 and 5, more preferably between about 1 and 4. In this manner, a second stream 68 is generated in the electrolysis unit, and this stream will thus generally have a lower ORP value, generally between about −400 mv and −800 mv, preferably between about −600 mv and −800 mv, and most preferably less than about −600 mv, and a concomitantly high pH level, generally between about 8 and 14, more preferably between about 10 and 14, and most preferably greater than about 10. This stream 68 can thus be returned to the effluent 33 to neutralize that effluent before it proceeds back to the bioreactor 12 as required. On the other hand, stream 68 can be discarded since it does not contain any chemically difficult species. In addition, as in the case previously discussed in connection with FIG. 1, molecular hydrogen produced in the electrolysis unit 60 can, as in the case of FIG. 1, be discharged through line 38 into the anaerobic bioreactor 22 to increase the rate of formation of methane relative to carbon dioxide therein. Alternatively, this molecular hydrogen may be discharged or collected for other uses; e.g., electricity generation in a fuel cell.

Figure 6:
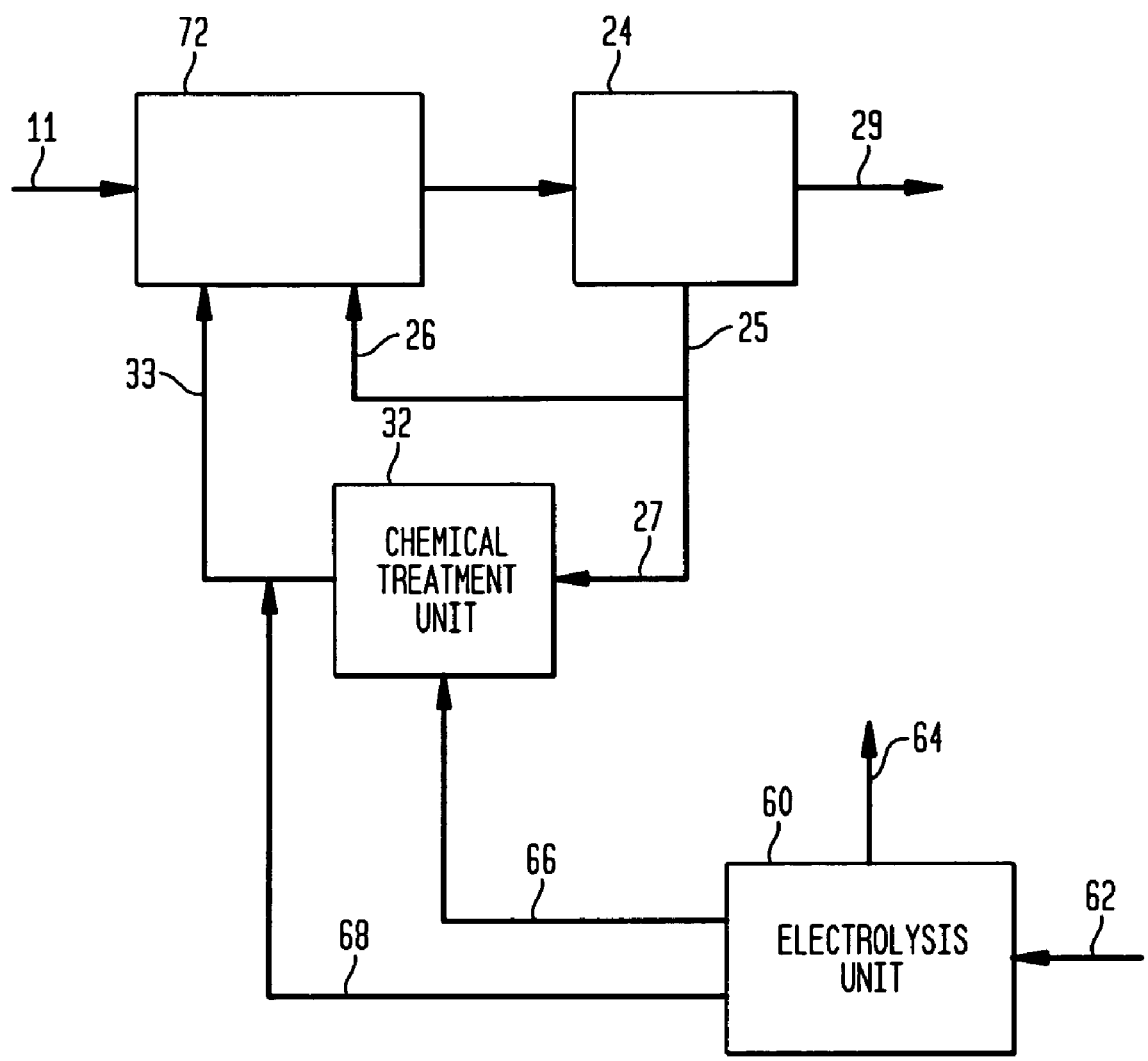
FIG. 6 is a block diagram of a digestion system including internal biosolids recycling, but including an integrated electrolysis unit for the generation of oxidizing agent for use in the chemical treatment unit thereof.

Turning to FIG. 6, another more general application of the use of electrolysis reactor 60 is set forth therein. In this preferred embodiment, while reactor 72 can constitute a bioreactor such as bioreactor 17 in FIG. 1, it can also constitute one of a number of other types of bioreactors, or digesting chambers. It can thus constitute an anaerobic reactor, as in the case in reactor 12 in FIG. 1, or it can be an aerobic mesophilic reactor and/or a thermophilic reactor. Thus, reactor 72 can constitute an autothermal aerobic digester zone, an autothermal aeration digester unit zone, or an autothermal anaerobic digestion unit, as each of these units is described, for example, in U.S. Pat. No. 5,492,624, the disclosure of which is therefore incorporated by reference herein. In any event, it is known, for example, in U.S. Pat. No. 5,492,624 to employ an oxidation step in which various chemical components are used to oxidize the reactor biomass produced therein. In accordance with the present invention, however, incorporation of the electrolysis unit 60 into the system for generation of the oxidizing agent which enters the chemical treatment unit 32 through line 66 is used to effect oxidation in the manner discussed with respect to the embodiment in FIG. 5, for example.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A process for the treatment of organic waste comprising digesting said organic waste under anaerobic conditions so as to convert at least a portion of said organic waste and produce a clear decant and a mixture of biomass and unconverted organic compounds, returning at least a first portion of said mixture of biomass and unconverted organic compounds to said digesting step so as to control the system net growth rate therein, partially oxidizing at least a second portion of said mixture of biomass and unconverted organic compounds by electrolysis to produce a conditioned effluent therein, and returning said conditioned effluent to said digesting step.

2. The process of claim 1 including digesting said at least a second portion of said mixture of biomass and unconverted organic compounds under anaerobic conditions to produce gaseous carbon compounds, a second clear decant and a second mixture of biomass and converted organic compounds, and feeding said second mixture of biomass and unconverted organic compounds to said partially oxidizing step.

3. The process of claim 2 including separating said second clear decant from said second mixture of biomass and unconverted organic compounds.

4. The process of claim 3 including monitoring the ORP of said conditioned effluent and adding oxidant to said partially oxidizing step to maintain said ORP at a predetermined level.

5. The process of claim 1 including conducting electrolysis of an aqueous stream so as to produce an oxidizing agent, and utilizing said oxidizing agent for said partially oxidizing step.

6. The process of claim 5 wherein aid aqueous stream includes an acid.

7. The process of claim 5 wherein said aqueous stream includes a salt.

8. The process of claim 7 wherein said salt comprises sodium chloride.

9. A process for the treatment of organic waste comprising contacting said organic waste with anaerobic acidogenic microorganisms so as to convert at least a portion of said organic waste and produce an acidic effluent comprising biomass, acidic organic compounds and unconverted organic compounds, contacting said acidic effluent with anaerobic methanogenic microorganisms so as to convert at least a portion of said acidic effluent to gaseous carbon compounds and produce a clear decant and a mixture of biomass and unconverted organic compounds, subjecting at least a portion of said mixture of biomass and unconverted organic compounds to electrolysis to produce a conditioned effluent therein, and recycling said conditioned effluent to said contacting of said organic waste with said anaerobic acidogenic microorganisms.

10. The process of claim 9 comprising generating molecular hydrogen during said electrolysis and introducing said molecular hydrogen during said contacting of said acidic effluent with said anaerobic methanogenic microorganisms to facilitate conversion of said acidic effluent to methane.

11. The process according to claim 9 wherein said contacting of said organic waste with said anaerobic acidogenic microorganisms is carried out at a temperature of from about 30 to 70° C.

12. The process of claim 9 wherein said contacting of said organic waste with said anaerobic acidogenic microorganisms is carried out at a hydraulic retention time of from about 1 to 24 hours.

13. The process of claim 9 wherein said contacting of said organic waste with said anaerobic acidogenic microorganisms is carried out at a solid retention time of from about 1 to 72 hours.

14. The process of claim 9 wherein said contacting of said acidic effluent with said anaerobic methanogenic microorganisms is carried out at a temperature of from about 30 to 70° C.

15. The process of claim 9 wherein said contacting of said acidic effluent with said anaerobic methanogenic microorganisms is carried out at a hydraulic retention time of from about 1 to 100 days.

16. The process of claim 9 wherein said contacting of said acidic effluent with said anaerobic methanogenic microorganisms is carried out at a solid retention time of from about 1 to 1,000 days.

17. The process of claim 9 including separating said clear decant from said mixture of biomass and unconverted organic compounds.

18. The process of claim 17 wherein said separating is carried out using a gravity settling tank.

19. The process of claim 9 including subjecting at least another portion of said mixture of said biomass and said unconverted organic compounds to contact with said acidic effluent.

20. The process of claim 9 including reducing the particle size of said at least a portion of said mixture of said biomass and unconverted organic compounds.

21. The process of claim 9 including monitoring the ORP of said conditioned effluent and adding oxidant to said electrolysis step to maintain said ORP at a predetermined level.

22. The process of claim 1 including separating said clear decant from said mixture of biomass and unconverted organic compounds.

23. The process of claim 22 wherein said separating of said clear decant from said mixture of biomass and unconverted compounds is carried out by means of a gravity settling tank.

24. A process for the treatment of organic waste comprising contacting said organic waste with anaerobic acidogenic microorganisms so as to convert at least a portion of said organic waste and produce a first clear decant comprising organic acids and a first mixture of biomass and unconverted organic material therein, returning at least a portion of said first mixture of biomass and unconverted organic material to said contacting of said organic waste with said anaerobic acidogenic microorganisms, contacting said first clear decant with anaerobic methanogenic microorganisms so as to convert at least a portion of said organic acids to gaseous carbon compounds and produce a second clear decant and a second mixture of biomass and unconverted organic compounds, returning at least a portion of said second mixture of biomass and unconverted organic material to said contacting of said first clear decant with said anaerobic methanogenic microorganisms, subjecting at least a portion of said first mixture of biomass and unconverted organic material and a portion of said second mixture of biomass and unconverted organic material to electrolysis to produce a conditioned effluent therein, and returning said conditioned effluent to contact said anaerobic acidogenic microorganisms so as to control the system net growth rate thereof.

25. The process of claim 24 including separating at least a portion of said first clear decant by means of a membrane system to allow organic acids having molecular weights below a desired molecular weight to pass therethrough in preference to organic acids having molecular weights above said desired molecular weight, and passing said organic acids passing through said membrane system to contacting with said anaerobic methanogenic microorganisms.

26. A process for the treatment of organic waste comprising digesting said organic waste in the presence of microorganisms so as to convert at least a portion of said organic waste and produce a clear decant and a mixture of biomass and unconverted organic compounds, producing an oxidizing agent by subjecting an aqueous feed stream containing an oxidizing agent precursor to electrolysis so as to produce a stream of oxidizing agent, partially oxidizing at least a portion of said mixture of biomass and unconverted organic compounds with said stream of oxidizing agent to produce a conditioned effluent therein, and returning said conditioned effluent to said digesting step.

27. The process of claim 26 including returning at least a first portion of said mixture of biomass and unconverted organic compounds to said digestion step so as to control the system net growth rate therein, wherein said at least a portion of said mixture of biomass and unconverted organic compounds comprises a second portion of said mixture of biomass and unconverted organic compounds.

28. The process of claim 26 wherein said digesting of said organic waste is carried out under aerobic or anaerobic conditions.

29. The process of claim 26 wherein said oxidizing agent precursor comprises an acid.

30. The process of claim 29 wherein said acid is selected from the group consisting of hydrochloric acid, nitric acid, sulfuric acid, and mixtures thereof.

31. The process of claim 26 wherein said stream of oxidizing agent has an ORP of between about +300 mv and +1400 mv.

32. The process of claim 31 wherein said stream of oxidizing agent has a pH of between about 0 and 14.

33. The process of claim 31 wherein said stream of oxidizing agent has a pH of between about 0 and 14.

34. The process of claim 26 wherein said stream of oxidizing agent comprises a first stream from said electrolysis step and including producing a second neutralizing stream from said electrolysis step.

35. The process of claim 34 wherein said second neutralizing stream has an ORP of between about −300 mv and −800 mv.

36. The process of claim 35 wherein said second neutralizing stream has a pH of between about 1 and 14.

37. The process of claim 35 wherein said neutralizing stream has a pH of between about 1 and 14.

38. The process of claim 35 including adding said second neutralizing stream to said conditioned effluent.

39. A process for the treatment of organic waste comprising digesting said organic waste under anaerobic conditions so as to convert at least a portion of said organic waste and produce a clear decant and a mixture of biomass and unconverted organic compounds, returning at least a first portion of said mixture of biomass and unconverted organic compounds to said digesting step so as to control the system net growth rate therein, producing an oxidizing agent by electrolysis of an aqueous feed stream, partially oxidizing at least a second portion of said mixture of biomass and unconverted organic compounds with said oxidizing agent to produce a conditioned effluent therein, and returning said conditioned effluent to said digesting step.

40. The process of claim 39 wherein said feed stream comprises an acid.

41. The process of claim 40 wherein said acid is selected from the group consisting of nitric acid, hydrochloric acid, sulfuric acid and mixtures thereof.

42. The process of claim 39 wherein said oxidizing agent has an ORP of between about +300 mv and +1400 mv.

43. The process of claim 42 wherein said oxidizing agent has a pH of between about 0 and 14.

44. The process of claim 42 wherein said oxidizing agent has a pH of between about 1 and 14.

45. The process of claim 39 including providing a neutralizing stream from said electrolysis.

46. The process of claim 45 wherein said neutralizing stream has an ORP of between about −300 mv and −800 mv.

47. The process of claim 46 wherein said neutralizing stream has a pH of between about 1 and 14.

48. The process of claim 45 wherein said neutralizing stream has a pH of between about 1 and 14.

49. The process of claim 45 including returning said neutralizing stream to said conditioned effluent.

50. The process of claim 39 including digesting said at least a second portion of said mixture of biomass and unconverted organic compounds under anaerobic conditions to produce gaseous carbon compounds, a second clear decant and a second mixture of biomass and unconverted organic compounds, and feeding said second mixture of biomass and unconverted organic compounds to said partially oxidizing step.

51. The process of claim 50 including separating said second clear decant from said second mixture of biomass and unconverted organic compounds.

52. The process of claim 51 including monitoring the ORP of said conditioned effluent and adding oxidant to said partially oxidizing step to maintain said ORP at a predetermined level.

53. A process for the treatment of organic waste comprising digesting said organic waste under anaerobic conditions so as to convert at least a portion of said organic waste and produce a clear decant and a mixture of biomass and unconverted organic compounds, returning at least a first portion of said mixture of biomass and unconverted organic compounds to said digesting step so as to control the system net growth rate therein, conducting electrolysis of an aqueous stream so as to produce an oxidizing agent, partially oxidizing at least a second portion of said mixture of biomass and unconverted organic compounds utilizing said oxidizing agent to produce a conditioned effluent therein, and returning said conditioned effluent to said digesting step.

54. The process of claim 53 wherein said aqueous stream is an acid.

55. The process of claim 53 wherein said aqueous stream includes a salt.

56. The process of claim 55 wherein said salt comprises sodium chloride.

* * * * *

UNITED STATES PATENT AND TRADEMARK OFFICE
CERTIFICATE OF CORRECTION

| | | |
|---|---|---|
| PATENT NO. | : 7,309,435 B2 | Page 1 of 1 |
| APPLICATION NO. | : 10/791644 | |
| DATED | : December 18, 2007 | |
| INVENTOR(S) | : Alan F. Rozich | |

It is certified that error appears in the above-identified patent and that said Letters Patent is hereby corrected as shown below:

Column 1, line 7, delete "provisional".
Column 13, line 10, after "day$^{-1}$" insert --,--.

Signed and Sealed this

Twenty-sixth Day of May, 2009

JOHN DOLL
*Acting Director of the United States Patent and Trademark Office*